United States Patent
Velingker (12)

(10) Patent No.: US 6,279,066 B1
(45) Date of Patent: Aug. 21, 2001

(54) SYSTEM FOR NEGOTIATING ACCESS TO A SHARED RESOURCE BY ARBITRATION LOGIC IN A SHARED RESOURCE NEGOTIATOR

(75) Inventor: Avinash Velingker, Orefield, PA (US)

(73) Assignee: Agere Systems Guardian Corp., Orlando, FL (US)

(*) Notice: Subject to any disclaimer, the term of this patent is extended or adjusted under 35 U.S.C. 154(b) by 0 days.

(21) Appl. No.: 09/099,778

(22) Filed: Jun. 19, 1998

Related U.S. Application Data
(60) Provisional application No. 60/065,855, filed on Nov. 14, 1997.

(51) Int. Cl.[7] .................................................. G06F 13/14
(52) U.S. Cl. .............................. 710/240; 710/36; 711/150
(58) Field of Search ..................................... 710/240, 241, 710/220, 200, 107, 113, 36; 711/147, 150, 151

(56) References Cited

U.S. PATENT DOCUMENTS

| | | |
|---|---|---|
| 5,339,443 * | 8/1994 | Lockwood . |
| 5,577,229 * | 11/1996 | Wakerly . |
| 5,956,337 * | 9/1999 | Michael ............................... 370/395 |
| 6,023,727 * | 2/2000 | Barrett et al. ......................... 709/221 |

* cited by examiner

*Primary Examiner*—Ario Etienne
(74) *Attorney, Agent, or Firm*—William H. Bollman

(57) ABSTRACT

A resource negotiation technique and apparatus which streamlines arbitration for access to a shared resource by centralizing arbitration for groups of shared resources such as control registers into an access register. An accessing agent first writes a request to an appropriate bit of a resource negotiation register (RNR), and then reads back a grant status. If the request for access to the shared resource is not successful in the first attempt, the requesting processor may continuously read the grant status until it is successful. Alternatively, the resource negotiation register may cause an interrupt in the requesting processor upon grant of access to the shared resource. A logic level indicating that access is denied generally indicates that another processor in the multi-processor system is currently granted access to the corresponding shared resource. Once the processor requesting permission for writing to the shared resource has been granted permission, that winning processor is expected to complete its access to the shared resource, and then indicate back to the shared resource negotiator that access is no longer required, e.g., by clearing the corresponding request bit.

21 Claims, 3 Drawing Sheets

BIT ASSIGNMENTS OF A RESOURCE NEGOTIATION CELL (RNC)

| AGENT | ACCESS TYPE | BIT 2 | BIT 1 | BIT 0 |
|---|---|---|---|---|
| PROCESSOR 1 | WRITE | – | | REQUEST 1 |
| PROCESSOR 2 | WRITE | – | REQUEST 2 | – |
| PROCESSOR 3 | WRITE | REQUEST 3 | – | – |
| ALL | READ | GRANT 3 | GRANT 2 | GRANT 1 |

RESOURCE NEGOTIATION PROCEDURE

SYSTEM FOR NEGOTIATING ACCESS TO A SHARED RESOURCE BY ARBITRATION LOGIC IN A SHARED RESOURCE NEGOTIATOR

This application claims priority from U.S. Provisional Application No. 60/065,855, entitled "Multipurpose Digital Signal Processing System", filed on Nov. 14, 1997, the specification of which is hereby expressly incorporated herein by reference.

BACKGROUND OF THE INVENTION

1. Field of the Invention

This invention relates generally to the sharing of common resources. More particularly, it relates to the simplification of the arbitration between a plurality of accessing processing agents for access to a common resource such as a register or memory location.

2. Background of Related Art

A multi-processor system typically has a plurality of microprocessors, digital signal processors (DSPs), microcontrollers and/or other processing agents running a synchronously with respect to one another. For various purposes, e.g., to conserve resources and/or to communicate information between processors, multi-processor systems often share access to one or more common resources.

Typically, only one processing agent may access the common resources at any one time. Thus, access to the shared resources must be coordinated such that only one processing agent at a time accesses the common resource. This coordination among the multiple processing agents for access to shared resources is referred to generally as arbitration.

Cumbersome techniques are conventionally implemented to arbitrate for one-at-a time access to the shared resource. For instance, in one conventional technique, individual arbitration logic is required for each of the shared resources (e.g., for each control register) to resolve write contention from the plurality of processors. However, this technique can become prohibitively expensive to implement, particularly when the number of shared resources each requiring its own arbitration logic is large.

Access to a shared resource may alternatively be arbitrated using a software semaphore technique, i.e., using software flags. In this technique, one of the processing agents is designated and placed in charge of allocating write and/or read access to the shared resources, referred to herein as an Allocator Processor. Then, any processor attempting to access that shared resource must first arbitrate for permission through a request to the designated Allocator Processor. The Allocator Processor is responsible for determining that no other processor is already accessing the shared resource or has a pending request for accessing the shared resource with a higher priority than that of the currently requesting processor. Upon determination that the shared resource is free, the Allocator Processor grants permission to the requesting processor to access the shared resource. After granting access to a winning agent, the Allocator Processor blocks write and/or read attempts by other processors to the same shared resource until the current process is completed. Thereafter, upon completion of its use of the shared resource, the accessing processor typically must again communicate with the Allocator Processor to signal that it is finished using the shared resource so that access may be granted to the next requesting processor. Thus, in this conventional software based technique, any processor desirous of accessing a shared resource must first request and be granted permission by a designated processor before being allowed to access that shared resource. However, complicated and time consuming communications between the requesting processor(s) and the Allocator Processor can result in prohibitive service delays, slowing down the performance of the entire multi-processor system.

There is thus a need for a simple arbitration technique which streamlines access by a plurality of processors to shared resources, e.g., control registers, without the need for elaborate arbitration logic implemented for each shared resource, and without requiring numerous transmissions between processors and a controlling processor before the shared resource can be accessed.

SUMMARY OF THE INVENTION

In accordance with the principles of the present invention, a shared resource negotiator comprises an access register, the access register including a plurality of write bits each corresponding to one of a plurality of processor's request to access a shared resource, and a plurality of read bits corresponding to a grant status to access the shared resource.

In accordance with another aspect of the present invention, a shared resource negotiator comprises a plurality of request bits. A plurality of grant bits corresponds respectively to the plurality of request bits. Arbitration logic is adapted and arranged to permit only one of the plurality of grant bits to become active at any one time.

A method of negotiating access to a shared resource in accordance with the principles of the present invention comprises storing an access request signal in a first bit in a register including at least two bits. A bit signal is output corresponding to a grant status with respect to the access request based on a status of at least one other bit in the register. The grant status is an access granted signal if the at least one other bit in the register is an access denied signal, and the grant status is an access denied signal if the at least one other bit in the register is an access granted signal.

Another method of negotiating access to a shared resource in accordance with the present invention comprises writing a first logic level to a specific bit in a register, and reading an output corresponding to the specific bit. The shared resource is accessed when the output indicates that access has been granted, and the specific bit in the register is cleared.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

A resource negotiation technique in accordance with the principles of the present invention streamlines arbitration for access to a shared resource by centralizing arbitration for groups of shared resources such as control registers into an access register. The access register minimizes the overall hardware logic by centralizing arbitration for a shared resource yet removes the necessity to designate an arbitrating or Allocator Processor to grant individual access to the shared resource. The terms negotiation cell and shared resource negotiator are interchangeably used herein.

In particular, the disclosed embodiment of the present invention provides an efficient and effective resource negotiation process wherein a processing agent (e.g., a microprocessor, DSP, microcontroller, on demand transfer (ODT) engine, etc.) requests access to a shared resource through an arbitration read and write register, referred to herein as a resource negotiation register (RNR). An accessing agent first writes a request logic value, e.g., a logic high or '1', to an appropriate bit of the resource negotiation register (RNR), and then reads back a grant logic value from the resource negotiation register. The success or failure of the access request is indicated by the value of the grant bit returned by the resource negotiation register.

If the access request from a requesting agent is successful as indicated by a read of the grant value, e.g., a logic high or '1' in the resource negotiation register in a bit location corresponding to the shared resource associated with the bit previously written to, the requesting agent then completes its use of the shared resource.

Upon completion of its use of the shared resource, the successful agent may then indicate its successful use of the shared resource by clearing the request bit written previously, e.g., by writing back the inverse logic value, e.g., a logic low or '0', in the bit location of the resource negotiation register corresponding to the shared resource.

If the request for access to the shared resource is not successful in the first attempt, the requesting processor may continuously read the grant value of the corresponding bit of the resource negotiation register until it receives a successful grant value, e.g., a logic high, indicating permission to access the shared resource.

In the disclosed embodiment, when not successful after the first read of the grant value the requesting agent need not re-write a request logic level to the corresponding bit in the resource negotiation register. However, in an alternative embodiment the resource negotiation register may be cleared after each unsuccessful access request, thus requiring the requesting processor to rewrite a request value in the appropriate bit of the resource negotiation register indicating that it still requires access to the shared resource.

Figure 1:
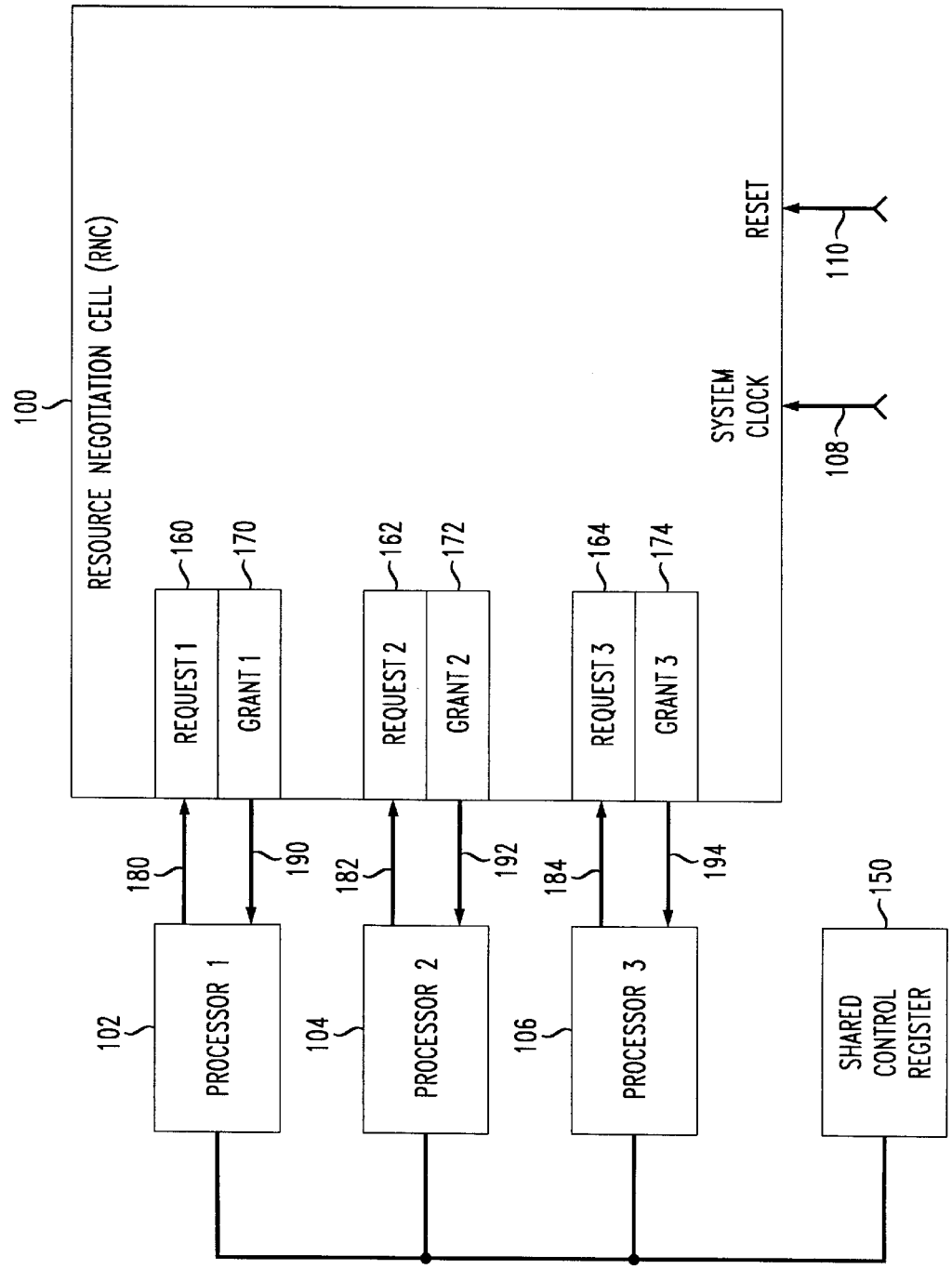
FIG. 1 is a block diagram of a shared resource negotiator in accordance with the disclosed embodiment of the present invention.

FIG. 1 shows a general block diagram of an exemplary shared resource negotiator (SRN) 100 controlling or arbitrating access by three processors 102, 104 and 106 to a shared resource, e.g., a shared control register 150. Of course, the present invention relates to any number of processors accessing any number of shared resources.

In particular, FIG. 1 shows a shared resource negotiator 100 including three access request bits 160, 162, 164 for writing by each of the three processors 102–106, and a corresponding three grant bits 170, 172, 174 for reading by the same three processors 102–106. The processors 102, 104 and 106 include appropriate software which allows the respective processor to access the shared control register 150 only after first requesting access to the shared control register 150 by writing to the corresponding request bit 160, 162 or 164 and reading a successful grant value in the corresponding grant bit 170, 172 or 174.

In the disclosed embodiment, the shared resource negotiator includes use of a high speed system clock signal 108 corresponding to any clock at least as fast as a fastest system clock for any of the processors 102–106.

A reset signal 110 to the shared resource negotiator 100 may be tied to an overall system reset signal to reset the status of the shared resource negotiator 100 to a default condition, e.g., no access granted to any processor.

In the disclosed embodiment, the address of the request bit and the address of the grant bit are the same with respect to each processor 102, 104, 106. In this way, each processor writes and reads to the same bit address and location with respect to any shared resource. However, the address and/or locations of the specific bits of the resource negotiation register for both read and write accesses by any processor may differ within the scope of the present invention.

Moreover, although FIG. 1 describes the principles of the invention with an application utilizing three processing agents 102, 104, 106 sharing a common resource (i.e., shared control register 150), the invention is equally applicable to applications including only two processing agents or including many more than three processing agents.

Figure 2:
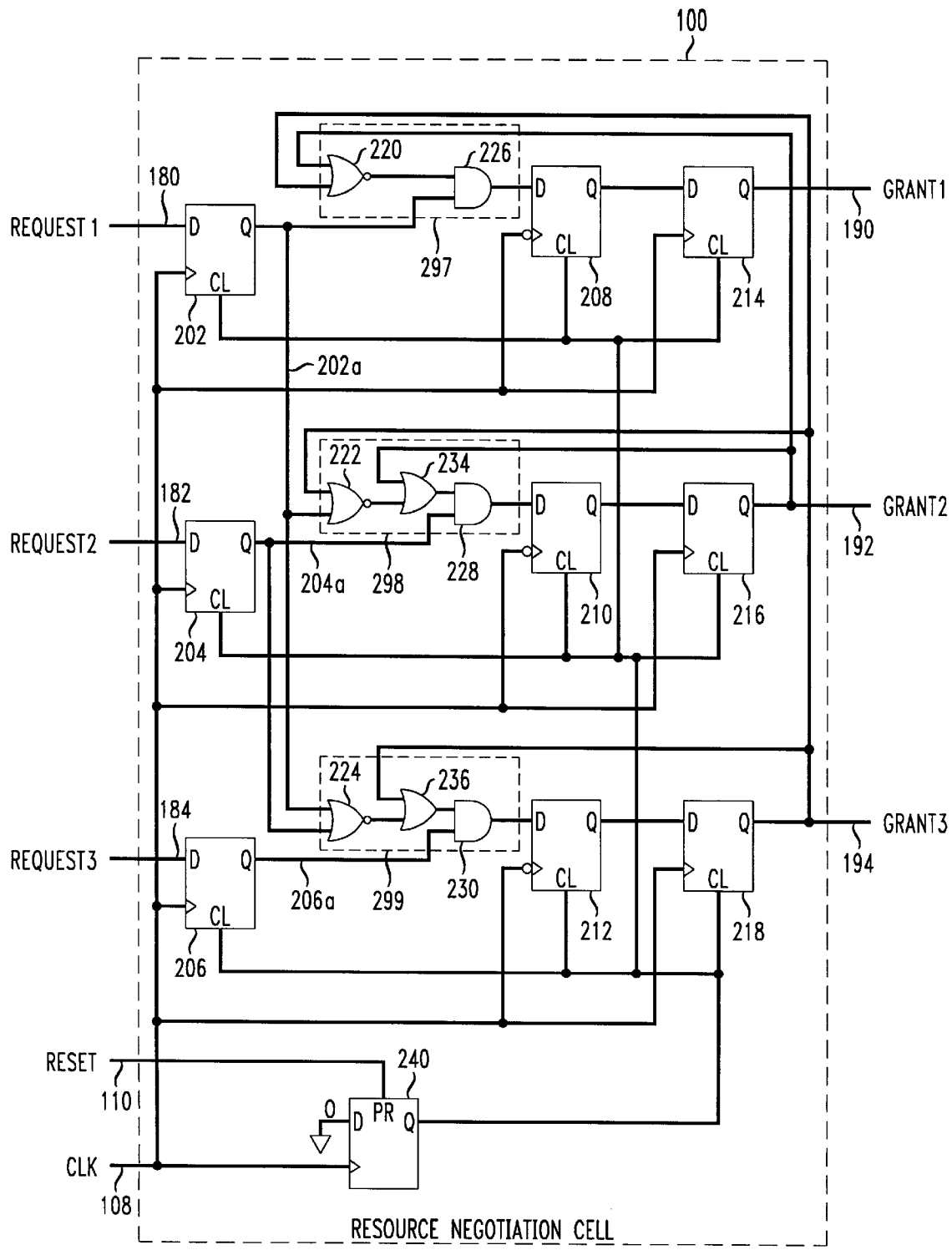
FIG. 2 is a more detailed circuit diagram of the shared resource negotiator shown in FIG. 1.

FIG. 2 is a detailed circuit diagram of an example embodiment of a shared resource negotiator 100 in accordance with the principles of the present invention. The specific circuit is shown for exemplary purposes only: Of course other equivalent circuits may be implemented to form a shared resource negotiator within the scope of the present invention.

In FIG. 2, request signals from the various processors are respectively latched into latches 202, 204 and 206 based on the system clock signal 108. Alternatively, the shared resource negotiator may implement memory or other storage element instead of the latches 202, 204 and/or 206. Preferably, the storage element for storing the request signal from a requesting processor would be synchronous with the system clock signal 108.

In the path of the first processor's request signal 180, arbitrating logic 297 determines that no other grant signal is active. Thus, the latched request signal output from the first latch 202 is ANDed with a NOR of the grant values of all other processors, i.e., with the GRANT2 signal 192 and GRANT3 signal 194 in the disclosed embodiment. The result is latched in a second latch 208, and again latched in a third latch 214, which outputs the grant value.

In the disclosed embodiment, each processor may write only to its corresponding request bit, but may read the status of all grant signals.

The first and third latches 202 and 214 operate on a first edge of the system clock signal 108, whereas the second latch 208 operates on the opposite edge of the system clock signal 108. Thus, the grant value will be available for reading by any of the processors (including the requesting processor) very quickly, e.g., after at most two clock cycles of the system clock 108. Moreover, the two clock cycle timing provides improved assurance against intervening access request signals from other processors against erroneous grants of access to the shared resource.

The second processor's request signal 182 is latched in latch 204 and then passed through arbitrating logic 298 which determines that grant signal 194 is currently inactive and that the latched REQUEST1 signal 202a is also currently inactive. Thereafter, the request signal REQUEST2 is latched on opposite edges of the system clock signal 108 by latches 210 and 216, respectively, and output as a second grant value 192 for reading by any of the processors.

Similarly, the third processor's request signal 184 is latched in latch 206 and then passed through arbitrating logic 299 which determines that the latched REQUEST1 signal 202a and the latched REQUEST2 signal 204a are currently inactive. Thereafter, the request signal is latched on opposite edges of the clock signal 108 by latches 212 and 218, respectively, and output as a third grant value 194 for reading by any of the processors.

If all processors were to simultaneously initiate an access request to the shared control register 150, the disclosed embodiment shown in FIGS. 1 and 2 provides the highest priority to the first processor 102, the second highest priority to the second processor 104, and the lowest priority to the third processor 106.

Appropriate tri-state output buffers (not shown) may be implemented to place the grant value output signals 190–194 in a high impedance state until read by any of the processors.

Activation of the reset signal 110 resets all latches 202–218 in the shared resource negotiator 100 based on the system clock signal 108.

Figures 3, 4:
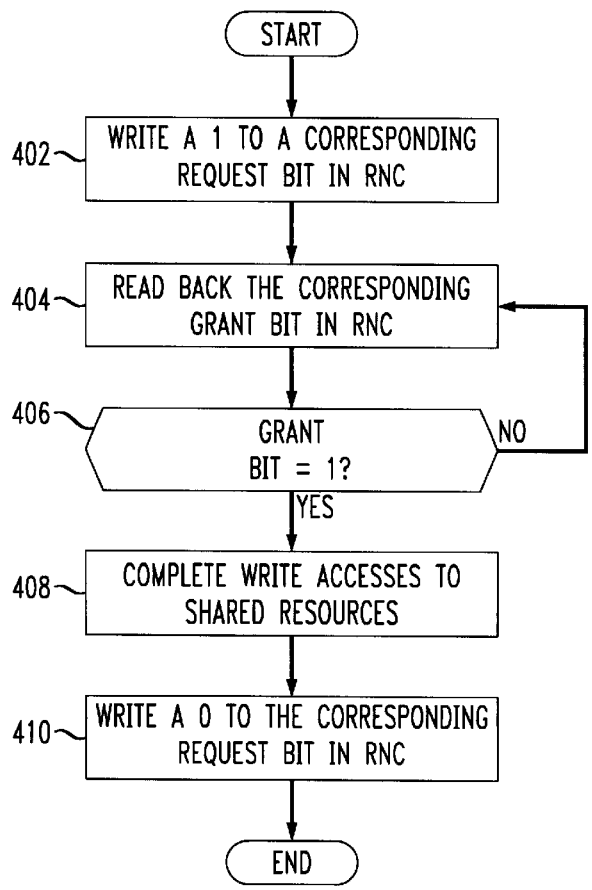
FIG. 3 is a table showing an example of bit assignments of a shared resource negotiator in accordance with the principles of the present invention.
FIG. 4 is a flow diagram showing example steps of negotiation for resources using a shared resource negotiator in accordance with the principles of the present invention.

FIG. 3 is a table showing exemplary bit assignments for the shared resource negotiator 100 shown in FIGS. 1 and 2.

In particular, bit 0 of the shared resource negotiator 100 is assigned to the first processor 102 (FIG. 1) for requesting access to a shared resource, e.g., shared control register 150 (FIG. 1), bit 2 is assigned to the second processor 104, and bit 3 is assigned to the third processor 106.

FIG. 3 shows that according to the present embodiment, each of the processors 102–106 can write only to its assigned bit location within the shared resource negotiator 100 and not to the other bit locations in the shared resource negotiator 100. For example, the first processor 102 can write only to bit 0 and not to bits 1 and 2 of the shared resource negotiator 100, the second processor 104 can write only to bit 1 and not to bits 0 and 2, and the third processor 106 can write only to bit 2 and not to bits 0 and 1. However, in the disclosed embodiment, all three of the processors 102–106 can read all bits of the shared resource negotiator 100, providing an additional source of information to the accessing processors 102–106 about the granting of access to the corresponding shared resource to other processors as well as to the corresponding processor.

FIG. 4 shows a process of requesting permission to write to a shared resource, e.g., the shared control register 150 shown in FIG. 1, in accordance with the principles of the present invention.

In particular, FIG. 4 shows in step 402 that a processor desiring to write to a shared resource first lodges a request for the shared resource by writing a predetermined logic level, e.g., a '1', to its assigned request bit in the corresponding shared resource negotiator 100.

In step 404, the requesting processor reads back the grant status (i.e., access granted or access denied) from the assigned read bit in the shared resource negotiator 100. In the disclosed embodiment the write and read bit are in the same relative location in the shared resource negotiator 100 register.

Step 406 determines whether or not the grant bit read back in step 404 indicates access granted (e.g., '1') or access denied (e.g., '0'). If the requesting processor reads back a logic value indicating that access has been granted, e.g., a '1', the requesting processor will then presume that it has been granted permission to write to the shared resource and complete its access to the shared resource in step 408. In the disclosed embodiment, the processor granted permission to access the shared resource will retain that permission until the corresponding request bit is cleared, e.g., by a write from the corresponding processor.

If, on the other hand, the requesting processor reads a logic level corresponding to an access denied, e.g., a '0', as determined in step 406, the requesting processor will then continuously or intermittently poll the shared resource negotiator 100 until it reads a logic level indicating that access has been granted, e.g., a '1'. A logic level indicating that access is denied generally indicates that another processor in the multi-processor system is currently granted access to the corresponding shared resource.

Once the processor requesting permission for writing to the shared resource has been granted permission, that winning processor is expected to complete its access to the shared resource, e.g., write access, and then indicate back to the shared resource negotiator 100 that access is no longer required, e.g., by clearing the corresponding request bit in the shared resource negotiator 100 as shown in step 410. Alternatively, the winning processor may indicate completion of its access by writing to another bit in the shared resource negotiator 100.

Although the embodiment shown in FIG. 4 shows polling by a processor to check if and when it has been granted permission to access a shared resource, an interrupt mechanism may be implemented to relieve the requesting processor from the task of polling after a request for access to a shared resource has been lodged in the shared resource negotiator 100. In this case, after writing a request to the corresponding bit of a shared resource negotiator, the shared resource negotiator may cause an interrupt in the requesting processor when permission to access the shared resource is finally granted.

The embodiments of the present invention have been described with respect to certain, arbitrarily assigned logic levels. Those of ordinary skill in the art would appreciate that the opposite logic levels can be implemented without departing from the scope of the present invention.

A shared resource negotiation technique in accordance with the principles of the present invention can reduce the amount or circuitry necessary to negotiation for access to shared resources, particularly when there are many shared resources, and correspondingly reduce the overall expense of the system.

The resource negotiation technique in accordance with the present invention provides a fast and efficient mechanism for negotiating access to shared resources, e.g., within two cycles of a system clock, without time delays caused by communications between a requesting processor and a designated Allocator Processor.

The resource negotiation technique of the present invention has particular application in multi-processor computer systems, e.g., telecommunications modem pools, audio code systems, and/or telecommunications systems, and offers system flexibility through its ability to dynamically and efficiently allocate shared resources within the system depending upon the application.

While the invention has been described with reference to the exemplary embodiments thereof, those skilled in the art will be able to make various modifications to the described embodiments of the invention without departing from the true spirit and scope of the invention.

What is claimed is:

1. A shared resource negotiator, comprising:
   an access register, said access register including:
   a plurality of write bits each corresponding to a request to access a shared resource, and
   a plurality of read bits corresponding to a grant status to access said shared resource by one of a plurality of processors; and arbitration logic granting said request by setting a respective read bit in response to said one of said plurality of processors setting at least one of said plurality of write bits.

2. The shared resource negotiator according to claim 1, wherein:

each of said plurality of read bits correspond to one of said plurality of processors.

3. The shared resource negotiator according to claim 1, wherein:

said plurality of write bits of said access register each comprise a latch.

4. The shared resource negotiator according to claim 1, wherein:

said plurality of write bits of said access register are comprised of memory.

5. The shared resource negotiator according to claim 1, wherein:

said plurality of read bits of said access register each comprise a latch.

6. A shared resource negotiator comprising:

a plurality of request bits;

a plurality of grant bits corresponding respectively to said plurality of request bits; and arbitration logic adapted and arranged to permit only one of said plurality of grant bits to become active at any one time.

7. A method of negotiating access to a shared resource, comprising:

storing an access request signal in a first bit in a register including at least two bits;

outputting a bit signal corresponding to a grant status with respect to said access request based on a status of at least one other bit in said register by arbitration logic of a shared resource negotiator, said grant status being an access granted signal if said at least one other bit in said register is an access denied signal, and said grant status being an access denied signal if said at least one other bit in said register is an access granted signal.

8. The method of negotiating access to a shared resource according to claim 7, further comprising:

requesting access to said shared resource from a first processor by writing a first logic level to said first bit in said register.

9. The method of negotiating access to a shared resource according to claim 7, further comprising:

reading said grant status from said register at said first processor;

accessing said shared resource from said first processor after said grant status indicates that access has been granted.

10. The method of negotiating access to a shared resource according to claim 7, further comprising:

interrupting said first processor when said grant status indicates that access is granted; and accessing said shared resource from said first processor after said grant status indicates that access has been granted.

11. Apparatus for negotiating access to a shared resource, comprising:

means for storing an access request signal in a first bit in a register including at least two bits;

means for outputting a bit signal corresponding to a grant status with respect to said access request based on a status of at least one other bit in said register by arbitration logic of a shared resource negotiator, said grant status being an access granted signal if said at least one other bit in said register is an access denied signal, and said grant status being an access denied signal if said at least one other bit in said register is an access granted signal.

12. The apparatus for negotiating access to a shared resource according to claim 11, further comprising:

means for requesting access to said shared resource from a first processor by writing a first logic level to said first bit in said register.

13. The apparatus for negotiating access to a shared resource according to claim 11, further comprising:

means for reading said grant status from said register at said first processor;

means for accessing said shared resource from said first processor after said grant status indicates that access has been granted.

14. The apparatus for negotiating access to a shared resource according to claim 11, further comprising:

means for interrupting said first processor when said grant status indicates that access is granted; and accessing said shared resource from said first processor after said grant status indicates that access has been granted.

15. A method of negotiating access to a shared resource, comprising:

writing a first logic level to a specific bit in a register of a shared resource negotiator;

reading back an output corresponding to said specific bit, said output generated by an arbitration logic of said shared resource negotiator;

accessing said shared resource when said output indicates that access has been granted; and clearing said specific bit in said register.

16. The method of negotiating access to a shared resource according to claim 15, wherein:

said clearing is performed by writing a second logic level to said specific bit in said register.

17. The method of negotiating access to a shared resource according to claim 15, wherein:

said clearing is performed by resetting said register.

18. Apparatus for negotiating access to a shared resource, comprising:

means for writing a first logic level to a specific bit in a register of a shared resource negotiator;

means for reading back an output corresponding to said specific bit, said output generated by an arbitration logic of said shared resource negotiator;

means for accessing said shared resource when said output indicates that access has been granted; and means for clearing said specific bit in said register.

19. The apparatus for negotiating access to a shared resource according to claim 18, wherein:

said means for clearing includes apparatus to write a second logic level to said specific bit in said register.

20. The apparatus for negotiating access to a shared resource according to claim 18, wherein:

said means for clearing includes apparatus to reset said register.

21. A multiprocessor based system, comprising:

a first processor;

a second processor;

a shared resource accessible from said first processor and from said second processor;

an access register, said access register including:
- a first write bit corresponding to a first request signal from said first processor to access said shared resource,
- a second write bit corresponding to a second request signal from said second processor to access said shared resource,
- a first read bit corresponding to a grant status for said first processor to access said shared resource, and
- a second read bit corresponding to a grant status for said second processor to access said shared resource; and arbitration logic granting said first request signal and said second request signal by setting said first read bit and said second read bit, respectively, in response to said first processor setting said first write bit and said second processor setting said second write bit, respectively.

* * * * *